(12) United States Patent
Srivastava et al.

(10) Patent No.: US 8,691,915 B2
(45) Date of Patent: Apr. 8, 2014

(54) COPOLYMERS AND POLYMER BLENDS HAVING IMPROVED REFRACTIVE INDICES

(75) Inventors: Rajiv Kumar Srivastava, New Delhi (IN); James Louis DeRudder, Mount Vernon, IN (US); Rajashakhar Totad, Kamataka (IN); Robert Walter Venderbosch, Bergen op Zoom (NL); Raja Krishnamurthy, Bangalore (ID)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 106 days.

(21) Appl. No.: 13/453,123

(22) Filed: Apr. 23, 2012

(65) Prior Publication Data

US 2013/0281628 A1    Oct. 24, 2013

(51) Int. Cl.
C08L 33/20 (2006.01)
C08F 220/46 (2006.01)
C08F 220/18 (2006.01)
C08F 26/00 (2006.01)

(52) U.S. Cl.
USPC ..... 525/148; 526/312; 526/329.2; 526/329.3; 526/326

(58) Field of Classification Search
USPC ............. 526/326, 312, 293.2, 293.3; 525/148
See application file for complete search history.

(56) References Cited

U.S. PATENT DOCUMENTS

| | | |
|---|---|---|
| 6,184,312 B1 | 2/2001 | Yamamoto et al. |
| 6,187,896 B1 | 2/2001 | Nakajima et al. |
| 6,194,497 B1 | 2/2001 | Willems et al. |
| 6,194,536 B1 | 2/2001 | Schmidt et al. |
| 6,239,216 B1 | 5/2001 | Montanari et al. |
| 6,251,975 B1 | 6/2001 | Kobayashi et al. |
| 6,274,670 B1 | 8/2001 | Adedeji et al. |
| 6,281,299 B1 | 8/2001 | Saito et al. |
| 6,284,824 B1 | 9/2001 | Iji et al. |
| 6,291,585 B1 | 9/2001 | Tomari et al. |
| 6,294,251 B1 | 9/2001 | Minagawa et al. |
| 6,296,785 B1 | 10/2001 | Nelson et al. |
| 6,296,920 B1 | 10/2001 | Buehler et al. |
| 6,297,303 B1 | 10/2001 | Kobayashi et al. |
| 6,297,314 B1 | 10/2001 | Hintze-Bruning et al. |
| 6,313,254 B1 | 11/2001 | Meijs et al. |
| 6,313,259 B1 | 11/2001 | Miyamoto et al. |
| 6,329,060 B1 | 12/2001 | Barkac et al. |
| 6,335,061 B1 | 1/2002 | Kanamori et al. |
| 6,337,139 B1 | 1/2002 | Sapper |
| 6,348,604 B1 | 2/2002 | Nelson et al. |
| 6,359,069 B1 | 3/2002 | Moulinie et al. |
| 6,372,304 B1 | 4/2002 | Sano et al. |
| 6,376,606 B1 | 4/2002 | Adedeji |
| 6,383,625 B1 | 5/2002 | Shoshi et al. |
| 6,383,641 B1 | 5/2002 | Kondou et al. |
| 6,399,205 B1 | 6/2002 | Sandlin et al. |
| 6,399,718 B1 | 6/2002 | Rink et al. |
| 6,410,678 B1 | 6/2002 | Ishida et al. |
| 6,426,128 B1 | 7/2002 | Kimmel et al. |
| 6,428,856 B1 | 8/2002 | Masuda et al. |
| 6,448,365 B1 | 9/2002 | Funakoshi et al. |
| 6,458,913 B1 | 10/2002 | Honigfort et al. |
| 6,465,953 B1 | 10/2002 | Duggal |
| 6,509,406 B1 | 1/2003 | Brenner et al. |
| 6,512,026 B1 | 1/2003 | Ott et al. |
| 6,512,044 B1 | 1/2003 | Wilke |
| 6,518,340 B1 | 2/2003 | Fishburn et al. |
| RE38,050 E | 3/2003 | Hachiya et al. |
| 6,537,636 B1 | 3/2003 | Wisnudel et al. |
| 6,569,919 B1 | 5/2003 | Noguchi et al. |
| 6,620,868 B1 | 9/2003 | Wilke |
| 6,623,858 B1 | 9/2003 | Yabe et al. |
| 6,656,601 B1 | 12/2003 | Kawachi et al. |
| 6,660,374 B2 | 12/2003 | Smetana et al. |
| 6,680,350 B1 | 1/2004 | Dobler |
| 6,696,148 B1 | 2/2004 | Seino et al. |
| 6,716,368 B1 | 4/2004 | Schottland et al. |
| 6,740,730 B1 | 5/2004 | Kratschmer et al. |
| 6,818,258 B2 | 11/2004 | Kaneko et al. |
| 6,818,304 B2 | 11/2004 | Miyako et al. |
| 6,846,567 B1 | 1/2005 | Ekinaka et al. |
| 6,855,779 B1 | 2/2005 | Nagata et al. |
| 6,979,704 B1 | 12/2005 | Mayer et al. |
| 7,074,351 B2 | 7/2006 | Dobler et al. |
| 7,169,834 B2 | 1/2007 | Dobler et al. |
| 7,217,749 B2 | 5/2007 | Gencer et al. |
| 7,253,215 B2 | 8/2007 | Takahashi et al. |
| 7,270,775 B2 | 9/2007 | Kubik et al. |
| 7,479,308 B2 | 1/2009 | Baumgart et al. |
| 7,517,944 B2 | 4/2009 | Kunishi et al. |
| 7,541,418 B2 | 6/2009 | Gerace et al. |
| 7,592,070 B2 | 9/2009 | Takanami et al. |
| 7,678,881 B2 | 3/2010 | Nishichi et al. |
| 7,767,738 B2 | 8/2010 | Gaggar et al. |
| 2001/0018487 A1 | 8/2001 | Itagaki et al. |
| 2001/0021742 A1 | 9/2001 | Finberg et al. |
| 2001/0028569 A1 | 10/2001 | Hanasaki |

(Continued)

FOREIGN PATENT DOCUMENTS

| | | |
|---|---|---|
| EP | 575810 B1 | 8/1998 |
| EP | 628064 B1 | 4/1999 |
| EP | 759459 B1 | 1/2001 |
| EP | 704067 B1 | 8/2001 |
| EP | 769508 B1 | 10/2001 |
| EP | 803548 B1 | 10/2001 |
| EP | 1142932 A1 | 10/2001 |
| EP | 1142933 A1 | 10/2001 |
| EP | 801750 B1 | 11/2001 |
| EP | 1162482 A2 | 12/2001 |
| EP | 703934 B1 | 2/2002 |
| EP | 781792 B1 | 2/2002 |
| EP | 1037885 B1 | 3/2002 |
| EP | 728164 B1 | 4/2002 |
| EP | 792468 B1 | 4/2002 |
| EP | 960174 B1 | 4/2002 |

(Continued)

*Primary Examiner* — Michael M Bernshteyn
(74) *Attorney, Agent, or Firm* — Ballard Spahr LLP

(57) ABSTRACT

This disclosure relates generally to methods for the manufacture of transparent polymer compositions exhibiting refractive indices similar or even identical to the refractive index of polycarbonate. Also disclosed are polymer blends comprising the disclosed polymer compositions blended with one or more convention polycarbonate.

25 Claims, No Drawings

(56) References Cited

U.S. PATENT DOCUMENTS

| | | |
|---|---|---|
| 2001/0034419 A1 | 10/2001 | Kanayama et al. |
| 2001/0036557 A1 | 11/2001 | Ingrim et al. |
| 2001/0036986 A1 | 11/2001 | Matsumura et al. |
| 2001/0044003 A1 | 11/2001 | Gallucci et al. |
| 2001/0050356 A1 | 12/2001 | Crano et al. |
| 2002/0002225 A1 | 1/2002 | Reil |
| 2002/0007078 A1 | 1/2002 | Lin |
| 2002/0010273 A1 | 1/2002 | Matsumura et al. |
| 2002/0032299 A1 | 3/2002 | Matsumoto et al. |
| 2002/0035207 A1 | 3/2002 | Hariharan et al. |
| 2002/0082310 A1 | 6/2002 | Barnes, II et al. |
| 2002/0086962 A1 | 7/2002 | Upper |
| 2002/0103328 A1 | 8/2002 | Funakoshi et al. |
| 2002/0107334 A1 | 8/2002 | Krishnan et al. |
| 2002/0111428 A1 | 8/2002 | Gaggar et al. |
| 2002/0127395 A1 | 9/2002 | Kuwabara |
| 2002/0128357 A1 | 9/2002 | Goossens et al. |
| 2002/0132122 A1 | 9/2002 | Marutsuka |
| 2002/0135092 A1 | 9/2002 | Risley |
| 2002/0155296 A1 | 10/2002 | Jonas et al. |
| 2003/0007764 A1 | 1/2003 | Hirota |
| 2003/0022963 A1 | 1/2003 | Parsons |
| 2003/0022967 A1 | 1/2003 | Dobler et al. |
| 2003/0022971 A1 | 1/2003 | Boyd et al. |
| 2003/0025228 A1 | 2/2003 | Prieur-Blanc et al. |
| 2003/0026992 A1 | 2/2003 | Anada et al. |
| 2003/0027905 A1 | 2/2003 | Mahood et al. |
| 2003/0032725 A1* | 2/2003 | Gaggar et al. ............ 525/67 |
| 2003/0060548 A1 | 3/2003 | Goossens et al. |
| 2003/0071247 A1 | 4/2003 | Petrovskaia et al. |
| 2003/0087102 A1 | 5/2003 | Yamaya et al. |
| 2003/0108716 A1 | 6/2003 | Nun et al. |
| 2003/0108735 A1 | 6/2003 | Hoppe et al. |
| 2003/0113544 A1 | 6/2003 | Tokuda et al. |
| 2003/0117707 A1 | 6/2003 | Uchida et al. |
| 2003/0124351 A1 | 7/2003 | Sakamoto et al. |
| 2003/0129409 A1 | 7/2003 | Tacke-Willemsen |
| 2003/0129931 A1 | 7/2003 | Konno et al. |
| 2003/0130381 A1 | 7/2003 | Joachimi et al. |
| 2003/0130390 A1 | 7/2003 | Gorny et al. |
| 2003/0134130 A1 | 7/2003 | Yano et al. |
| 2003/0158309 A1 | 8/2003 | Ono et al. |
| 2003/0158321 A1 | 8/2003 | Watanabe et al. |
| 2003/0162025 A1 | 8/2003 | Gorny et al. |
| 2003/0164477 A1 | 9/2003 | Zhou et al. |
| 2003/0173546 A1 | 9/2003 | Hiroshi et al. |
| 2003/0175499 A1 | 9/2003 | Phillips |
| 2003/0195295 A1* | 10/2003 | Mahood et al. ............ 525/67 |
| 2003/0195329 A1 | 10/2003 | Funakoshi et al. |
| 2003/0197301 A1 | 10/2003 | Winkler et al. |
| 2003/0219549 A1 | 11/2003 | Shimizu |
| 2004/0009346 A1 | 1/2004 | Jang et al. |
| 2004/0023041 A1 | 2/2004 | O'Keefe et al. |
| 2004/0028908 A1 | 2/2004 | Vollenberg et al. |
| 2004/0028920 A1 | 2/2004 | Fujita et al. |
| 2004/0071998 A1 | 4/2004 | Higuchi et al. |
| 2004/0091725 A1 | 5/2004 | Chang et al. |
| 2004/0096683 A1 | 5/2004 | Ikeda et al. |
| 2004/0096776 A1 | 5/2004 | Tanigawa et al. |
| 2004/0106732 A1 | 6/2004 | Tsuji et al. |
| 2004/0122168 A1 | 6/2004 | Murray |
| 2004/0127594 A1 | 7/2004 | Yang et al. |
| 2004/0127653 A1 | 7/2004 | Ellington et al. |
| 2004/0152806 A1 | 8/2004 | Koga et al. |
| 2004/0152810 A1 | 8/2004 | Takenaka et al. |
| 2004/0176600 A1 | 9/2004 | Juhue et al. |
| 2004/0180193 A1 | 9/2004 | Oda et al. |
| 2004/0185198 A1 | 9/2004 | Sisson et al. |
| 2004/0185268 A1 | 9/2004 | Kumar et al. |
| 2004/0186216 A1 | 9/2004 | Satoh et al. |
| 2004/0202879 A1 | 10/2004 | Xia et al. |
| 2004/0220330 A1 | 11/2004 | DeRudder et al. |
| 2004/0224111 A1 | 11/2004 | Sisson et al. |
| 2004/0236069 A1 | 11/2004 | Clements et al. |
| 2004/0241375 A1 | 12/2004 | Koya et al. |
| 2004/0249061 A1 | 12/2004 | Sunkara et al. |
| 2004/0249069 A1 | 12/2004 | Nakai et al. |
| 2004/0253402 A1 | 12/2004 | Der Wal et al. |
| 2004/0266942 A1 | 12/2004 | Ramlow |
| 2005/0009968 A1 | 1/2005 | Singh et al. |
| 2005/0017384 A1 | 1/2005 | Tamai et al. |
| 2005/0065293 A1 | 3/2005 | Vollenberg et al. |
| 2005/0075466 A1 | 4/2005 | Oguro et al. |
| 2005/0084643 A1 | 4/2005 | Steinberger et al. |
| 2005/0101687 A1 | 5/2005 | Kim et al. |
| 2005/0101757 A1 | 5/2005 | Glasgow et al. |
| 2005/0106394 A1 | 5/2005 | Osterloh |
| 2005/0118429 A1 | 6/2005 | Taylor |
| 2005/0137358 A1 | 6/2005 | Zhang et al. |
| 2005/0137359 A1 | 6/2005 | Agarwal et al. |
| 2005/0137360 A1 | 6/2005 | Shaikh et al. |
| 2005/0143553 A1 | 6/2005 | Morishita et al. |
| 2005/0147778 A1 | 7/2005 | Tai et al. |
| 2005/0158555 A1 | 7/2005 | Anders et al. |
| 2005/0182167 A1 | 8/2005 | Goodson et al. |
| 2005/0188895 A1 | 9/2005 | Chamberlain et al. |
| 2005/0196618 A1 | 9/2005 | Knox et al. |
| 2005/0196626 A1 | 9/2005 | Knox et al. |
| 2005/0203257 A1 | 9/2005 | Uchida et al. |
| 2005/0215677 A1 | 9/2005 | Gaggar et al. |
| 2005/0215750 A1 | 9/2005 | Koga et al. |
| 2005/0233070 A1 | 10/2005 | Pellerite et al. |
| 2005/0234178 A1 | 10/2005 | Andrews |
| 2006/0004152 A1 | 1/2006 | Acar et al. |
| 2006/0014880 A1 | 1/2006 | Zhong et al. |
| 2006/0020075 A1 | 1/2006 | Basham et al. |
| 2006/0052486 A1 | 3/2006 | Fujita |
| 2006/0063891 A1 | 3/2006 | Ruzette et al. |
| 2006/0078688 A1 | 4/2006 | DeSimone et al. |
| 2006/0078717 A1 | 4/2006 | Yamaya et al. |
| 2006/0084732 A1 | 4/2006 | Shakely et al. |
| 2006/0106159 A1 | 5/2006 | Ogawa et al. |
| 2006/0121204 A1 | 6/2006 | Nakae et al. |
| 2006/0132912 A1 | 6/2006 | Haese et al. |
| 2006/0134366 A1 | 6/2006 | Haese et al. |
| 2006/0134426 A1 | 6/2006 | Horio et al. |
| 2006/0135690 A1 | 6/2006 | Juikar et al. |
| 2006/0142527 A1 | 6/2006 | Glasgow et al. |
| 2006/0148986 A1 | 7/2006 | Glasgow et al. |
| 2006/0197246 A1 | 9/2006 | Hale et al. |
| 2006/0198999 A1 | 9/2006 | Rudiger et al. |
| 2006/0235116 A1 | 10/2006 | Lazzari et al. |
| 2006/0247372 A1 | 11/2006 | Faler et al. |
| 2006/0264582 A1 | 11/2006 | Mullen et al. |
| 2006/0281846 A1 | 12/2006 | Hager et al. |
| 2006/0281860 A1 | 12/2006 | Higuchi et al. |
| 2006/0289841 A1 | 12/2006 | Ito et al. |
| 2006/0292306 A1 | 12/2006 | Goebel et al. |
| 2007/0015881 A1 | 1/2007 | Hale |
| 2007/0032607 A1 | 2/2007 | Fuji |
| 2007/0045596 A1 | 3/2007 | King et al. |
| 2007/0054983 A1 | 3/2007 | Pudleiner et al. |
| 2007/0077399 A1 | 4/2007 | Borowiec et al. |
| 2007/0077414 A1 | 4/2007 | Rudiger et al. |
| 2007/0078220 A1 | 4/2007 | Pudleiner et al. |
| 2007/0088126 A1 | 4/2007 | Pudleiner et al. |
| 2007/0100088 A1 | 5/2007 | Gallucci et al. |
| 2007/0112123 A1 | 5/2007 | Sekine |
| 2007/0128442 A1 | 6/2007 | Buehler |
| 2007/0135586 A1 | 6/2007 | Chakravarti et al. |
| 2007/0155867 A1 | 7/2007 | Ikari et al. |
| 2007/0173581 A1 | 7/2007 | Hager et al. |
| 2007/0179252 A1 | 8/2007 | Lamberts et al. |
| 2007/0191519 A1 | 8/2007 | Jiao et al. |
| 2007/0210287 A1 | 9/2007 | Guerra |
| 2007/0213451 A1 | 9/2007 | Nabeshima et al. |
| 2007/0213459 A1 | 9/2007 | Tamai et al. |
| 2007/0224367 A1 | 9/2007 | Rudiger et al. |
| 2007/0225416 A1 | 9/2007 | Faber et al. |
| 2007/0225436 A1 | 9/2007 | Tamai et al. |
| 2007/0228587 A1 | 10/2007 | Ikari |
| 2007/0259117 A1 | 11/2007 | Archey et al. |
| 2007/0270530 A1 | 11/2007 | Kamo et al. |
| 2007/0275234 A1 | 11/2007 | Lim et al. |

(56) References Cited

U.S. PATENT DOCUMENTS

| | | |
|---|---|---|
| 2007/0293600 A1 | 12/2007 | Tamura |
| 2008/0000917 A1 | 1/2008 | Agarwal et al. |
| 2008/0012032 A1 | 1/2008 | Bhandarkar et al. |
| 2008/0014451 A1 | 1/2008 | Metz et al. |
| 2008/0021177 A1 | 1/2008 | Boyles et al. |
| 2008/0029933 A1 | 2/2008 | Higashiizumi et al. |
| 2008/0038549 A1 | 2/2008 | Griswold et al. |
| 2008/0071020 A1 | 3/2008 | Kobayashi |
| 2008/0075936 A1 | 3/2008 | McGurran et al. |
| 2008/0090958 A1 | 4/2008 | Rudiger et al. |
| 2008/0102262 A1 | 5/2008 | Esaki et al. |
| 2008/0103235 A1 | 5/2008 | Hale |
| 2008/0107858 A1 | 5/2008 | Meyer et al. |
| 2008/0119618 A1 | 5/2008 | Agarwal et al. |
| 2008/0142761 A1 | 6/2008 | Charati et al. |
| 2008/0145547 A1 | 6/2008 | Schneider et al. |
| 2008/0146759 A1 | 6/2008 | Takashima et al. |
| 2008/0161483 A1 | 7/2008 | Kind |
| 2008/0182094 A1 | 7/2008 | Meyer et al. |
| 2008/0182930 A1 | 7/2008 | Adachi |
| 2008/0194732 A1 | 8/2008 | Patterson |
| 2008/0214706 A1 | 9/2008 | Peter et al. |
| 2008/0227901 A1 | 9/2008 | Lefevre et al. |
| 2008/0233395 A1 | 9/2008 | Masuda |
| 2008/0233405 A1 | 9/2008 | Dronzek, Jr. |
| 2008/0242873 A1 | 10/2008 | Basale et al. |
| 2008/0262117 A1 | 10/2008 | Avakian et al. |
| 2008/0269386 A1 | 10/2008 | Chakravarti et al. |
| 2008/0269399 A1 | 10/2008 | Chakravarti et al. |
| 2008/0269400 A1 | 10/2008 | Chakravarti et al. |
| 2008/0283189 A1* | 11/2008 | Dhawan et al. ............... 156/281 |
| 2009/0012205 A1 | 1/2009 | Nakada et al. |
| 2009/0014687 A1 | 1/2009 | Kaskel et al. |
| 2009/0029147 A1 | 1/2009 | Tang et al. |
| 2009/0029154 A1 | 1/2009 | Hala et al. |
| 2009/0029172 A1 | 1/2009 | Isozaki |
| 2009/0030129 A1 | 1/2009 | Chakravarti et al. |
| 2009/0040618 A1 | 2/2009 | Iyama |
| 2009/0043053 A1 | 2/2009 | Gorny et al. |
| 2009/0062436 A1 | 3/2009 | Breiner |
| 2009/0062438 A1 | 3/2009 | van de Grampel et al. |
| 2009/0076222 A1 | 3/2009 | Pugne |
| 2009/0093568 A1 | 4/2009 | Lacock et al. |
| 2009/0111951 A1 | 4/2009 | Lin et al. |
| 2009/0123698 A1 | 5/2009 | Nishino et al. |
| 2009/0123721 A1 | 5/2009 | Yang |
| 2009/0124744 A1 | 5/2009 | Ishizaka et al. |
| 2009/0130295 A1 | 5/2009 | Broguiere et al. |
| 2009/0136730 A1 | 5/2009 | Nakano et al. |
| 2009/0142537 A1 | 6/2009 | Hong et al. |
| 2009/0156732 A1 | 6/2009 | Rajaraman et al. |
| 2009/0156737 A1 | 6/2009 | Schindler et al. |
| 2009/0186967 A1 | 7/2009 | Akada et al. |
| 2009/0203852 A1 | 8/2009 | Urakami et al. |
| 2009/0208755 A1 | 8/2009 | Isozaki et al. |
| 2009/0209707 A1 | 8/2009 | Okunaka et al. |
| 2009/0259000 A1 | 10/2009 | Urakami et al. |
| 2009/0274896 A1 | 11/2009 | Takeshi et al. |
| 2009/0284603 A1 | 11/2009 | Hsieh |
| 2009/0326110 A1 | 12/2009 | Tanaka et al. |
| 2009/0326129 A1 | 12/2009 | Rogunova et al. |
| 2010/0010172 A1 | 1/2010 | Hong et al. |
| 2010/0021709 A1 | 1/2010 | Niimi et al. |
| 2010/0028640 A1 | 2/2010 | Isozaki et al. |
| 2010/0029855 A1 | 2/2010 | Matsuoka et al. |
| 2010/0032608 A1 | 2/2010 | Peri et al. |
| 2010/0048805 A1 | 2/2010 | Nakabayashi |
| 2010/0048855 A1 | 2/2010 | Kato et al. |
| 2010/0051882 A1 | 3/2010 | Li et al. |
| 2010/0062272 A1 | 3/2010 | Wursche et al. |
| 2010/0068504 A1 | 3/2010 | Lin et al. |
| 2010/0069537 A1 | 3/2010 | Breiner |
| 2010/0069543 A1 | 3/2010 | Monden et al. |
| 2010/0076130 A1 | 3/2010 | Miyake et al. |
| 2010/0076172 A1 | 3/2010 | Tanabe et al. |
| 2010/0087578 A1 | 4/2010 | Kawano et al. |
| 2010/0092755 A1 | 4/2010 | Pudleiner et al. |
| 2010/0098943 A1 | 4/2010 | Temchenko et al. |
| 2010/0104805 A1 | 4/2010 | Ebina et al. |
| 2010/0105846 A1 | 4/2010 | Kogure |
| 2010/0129649 A1 | 5/2010 | Malinoski et al. |
| 2010/0152357 A1 | 6/2010 | Kwon et al. |
| 2010/0160511 A1 | 6/2010 | Jung et al. |
| 2010/0160545 A1 | 6/2010 | Page |
| 2010/0160557 A1 | 6/2010 | Murofushi et al. |
| 2010/0168272 A1 | 7/2010 | Park et al. |
| 2010/0168295 A1 | 7/2010 | Breiner et al. |
| 2010/0168370 A1 | 7/2010 | Hatano et al. |
| 2010/0173134 A1 | 7/2010 | Khokhlov et al. |
| 2010/0179286 A1 | 7/2010 | Oda et al. |
| 2010/0180938 A1 | 7/2010 | Nagato et al. |
| 2010/0184884 A1 | 7/2010 | Miyake et al. |
| 2010/0184905 A1 | 7/2010 | Chen |
| 2010/0186891 A1 | 7/2010 | Ruch et al. |
| 2010/0190897 A1 | 7/2010 | Maletzko et al. |
| 2010/0190953 A1 | 7/2010 | Fuji et al. |
| 2010/0195313 A1 | 8/2010 | Hiraishi et al. |
| 2010/0197867 A1 | 8/2010 | Niimi et al. |

FOREIGN PATENT DOCUMENTS

| | | |
|---|---|---|
| EP | 1195758 A1 | 4/2002 |
| EP | 646446 B1 | 8/2002 |
| EP | 786675 B1 | 11/2002 |
| EP | 1112264 B1 | 11/2002 |
| EP | 698631 B1 | 12/2002 |
| EP | 1273935 A1 | 1/2003 |
| EP | 797627 B1 | 4/2003 |
| EP | 863185 B1 | 5/2003 |
| EP | 994911 B1 | 8/2003 |
| EP | 996692 B1 | 9/2003 |
| EP | 1173509 B1 | 9/2003 |
| EP | 1104794 B1 | 10/2003 |
| EP | 1357145 A1 | 10/2003 |
| EP | 912648 B1 | 11/2003 |
| EP | 906366 B1 | 12/2003 |
| EP | 970996 B1 | 1/2004 |
| EP | 951390 B1 | 3/2004 |
| EP | 1134075 B1 | 3/2004 |
| EP | 1075963 B1 | 5/2004 |
| EP | 736574 B1 | 6/2004 |
| EP | 748259 B1 | 9/2004 |
| EP | 834535 B1 | 9/2004 |
| EP | 893481 B1 | 9/2004 |
| EP | 829520 B1 | 10/2004 |
| EP | 1085974 B1 | 11/2004 |
| EP | 1475362 A1 | 11/2004 |
| EP | 1484349 A2 | 12/2004 |
| EP | 1022129 B1 | 7/2005 |
| EP | 1550699 A1 | 7/2005 |
| EP | 930341 B1 | 9/2005 |
| EP | 954522 B1 | 10/2005 |
| EP | 1595920 A1 | 11/2005 |
| EP | 994871 B1 | 2/2006 |
| EP | 1403842 B1 | 2/2006 |
| EP | 1632514 A1 | 3/2006 |
| EP | 1757422 A1 | 2/2007 |
| EP | 1558402 B1 | 4/2007 |
| EP | 1772667 A2 | 4/2007 |
| EP | 1777255 A2 | 4/2007 |
| EP | 1265944 B1 | 5/2007 |
| EP | 890119 B1 | 6/2007 |
| EP | 1925427 A1 | 5/2008 |
| EP | 1856199 B1 | 6/2008 |
| EP | 1583799 B1 | 11/2008 |
| EP | 2009057 A1 | 12/2008 |
| EP | 2045294 A1 | 4/2009 |
| EP | 1543069 B1 | 12/2009 |
| EP | 2172521 A1 | 4/2010 |
| EP | 2206738 A1 | 7/2010 |
| EP | 2213490 A1 | 8/2010 |
| WO | WO-0170719 A2 | 9/2001 |
| WO | WO-0183615 A2 | 11/2001 |

(56) References Cited

FOREIGN PATENT DOCUMENTS

| | | |
|---|---|---|
| WO | WO-0187267 A1 | 11/2001 |
| WO | WO-0196469 A1 | 12/2001 |
| WO | WO-0230682 A2 | 4/2002 |
| WO | WO-02079336 A1 | 10/2002 |
| WO | WO-02079342 A1 | 10/2002 |
| WO | WO-03004561 A2 | 1/2003 |
| WO | WO-03025638 A1 | 3/2003 |
| WO | WO-03050176 A1 | 6/2003 |
| WO | WO-03074579 A1 | 9/2003 |
| WO | WO-2004007587 A1 | 1/2004 |
| WO | WO-2004033543 A2 | 4/2004 |
| WO | WO-2004047674 A2 | 6/2004 |
| WO | WO-2004060999 A1 | 7/2004 |
| WO | WO-2004094142 A1 | 11/2004 |
| WO | WO-2004101653 A2 | 11/2004 |
| WO | WO-2004108815 A2 | 12/2004 |
| WO | WO-2005049729 A1 | 6/2005 |
| WO | WO-2005062081 A1 | 7/2005 |
| WO | WO-2005073268 A1 | 8/2005 |
| WO | WO-2005105938 A1 | 11/2005 |
| WO | WO-2007005429 A2 | 1/2007 |
| WO | WO-2007015273 A1 | 2/2007 |
| WO | WO-2007021555 A1 | 2/2007 |
| WO | WO-2007037859 A2 | 4/2007 |
| WO | WO-2007067538 A1 | 6/2007 |
| WO | WO-2007070092 A2 | 6/2007 |
| WO | WO-2007082811 A2 | 7/2007 |
| WO | WO-2008056851 A1 | 5/2008 |
| WO | WO-2008133776 A2 | 11/2008 |
| WO | WO 2008149260 A1 * | 12/2008 |
| WO | WO-2008152741 A1 | 12/2008 |
| WO | WO-2009005318 A1 | 1/2009 |
| WO | WO-2009028817 A1 | 3/2009 |
| WO | WO-2009074554 A1 | 6/2009 |
| WO | WO-2009080974 A2 | 7/2009 |
| WO | WO-2009086246 A1 | 7/2009 |
| WO | WO-2009091155 A2 | 7/2009 |
| WO | WO-2009105565 A2 | 8/2009 |
| WO | WO-2010051525 A1 | 5/2010 |
| WO | WO-2010066982 A1 | 6/2010 |

\* cited by examiner

COPOLYMERS AND POLYMER BLENDS HAVING IMPROVED REFRACTIVE INDICES

BACKGROUND OF THE INVENTION

Blends of polycarbonate and various other polymer compositions such as acrylonitrile-butadiene-styrene (ABS) and styrene-acrylonitrile (SAN) are well known for their advantageous performance properties. However, polycarbonate blends with other non-polycarbonate material often lack the desired level of transparency and haze. To that end, several attempts have been made to improve the transparency and to reduce the haze of polycarbonate blends with various combinations of acrylonitrile-butadiene-styrene, styrene, acrylonitrile, and other monomers. However, none of these attempts were able to produce a polycarbonate blend that exhibits a relatively high transparency and relatively low haze characterized by a refractive index similar or the same as that of the polycarbonate itself. There remains a need in the art for such polycarbonate blends and for polymer compositions that are capable of providing such polycarbonate blends.

SUMMARY OF THE INVENTION

This invention relates generally to polymer compositions having refractive indices similar or the same as the refractive index of a conventional polycarbonate. These polymer compositions can in turn be blended with one or more polycarbonates to provide a polycarbonate polymer blend that exhibits a refractive index of a conventional polycarbonate without affecting its blend compatibility and other performance and processing properties similar to that of other compatible ABS polymers when blended with polycarbonate.

According to aspects of the invention, a cotetrapolymer composition is provided that exhibits a refractive index value "n" at least substantially similar to a refractive index value "n" of a conventional polycarbonate of Bisphenol-A. The cotetrapolymer composition comprises styrene, acrylonitrile, methylmethacrylate, and α-methylstyrene. The disclosed tetrapolymer composition can be prepared by any conventional method for co-polymerizing the four co-monomers, such as emulsion, suspension, and bulk or mass polymerization.

In other aspects, the present invention provides polymer blend compositions comprising one or more conventional polycarbonates of Bisphenol-A blended together with one or more of the disclosed tetrapolymer compositions summarized above and described herein. The polymer blend can comprise from about 1 to about 99 parts by weight polycarbonate and from about 99 to about 1 parts by weight of a disclosed tetrapolymer. The polymer blend further exhibits a refractive index value "n" at least substantially similar or even identical to the refractive index value "n" of the conventional polycarbonate of Bisphenol-A present in the blend.

Other advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

In other aspects, the present invention provides polymer blend compositions comprising one or more conventional polycarbonates other than a Bisphenol-A polycarbonate blended together with one or more of the disclosed tetrapolymer compositions summarized above and described herein. The polymer blend compositions according to these aspects can comprise from about 1 to about 99 parts by weight conventional polycarbonate and from about 99 to about 1 parts by weight of a disclosed tetrapolymer.

DETAILED DESCRIPTION Of The INVENTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those of ordinary skill in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a "branching agent" can include two or more such branching agents unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All ranges disclosed herein are inclusive of the endpoints and are independently combinable. The endpoints of the ranges and any values disclosed herein are not limited to the precise range or value; they are sufficiently imprecise to include values approximating these ranges and/or values. Ranges articulated within this disclosure, e.g. numerics/values, shall include disclosure for possession purposes and claim purposes of the individual points within the range, sub-ranges, and combinations thereof. As an example, for the recitation of numeric ranges herein, each intervening number there between with the same degree of precision is explicitly contemplated—for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Various combinations of elements of this disclosure are encompassed by this invention, e.g. combinations of elements from dependent claims that depend upon the same independent claim.

As used herein, the terms "optional" or "optionally" mean that the subsequently described event, condition, component, or circumstance may or may not occur, and that the description includes instances where said event or circumstance occurs and instances where it does not.

As used herein, the term polycarbonate is not intended to refer to a specific polycarbonate or group of polycarbonate but rather refers to the any one of the class of compounds containing a repeating chain of carbonate groups. Exemplary polycarbonates include aromatic polycarbonates. Aromatic Polycarbonates conventionally manufactured through a transesterification reaction of an one or more aromatic dihydroxy compound(s) and a carbonic acid diester in the presence of one or more catalyst(s). The one or more dihydroxy aromatic compound(s)s that may be used in the transesterification reaction may include a dihydric phenol or a combination of dihydric phenols or a bisphenol or a combination of bisphenols or a combination of one more dihydric phenol(s) with one or more bisphenol(s). As one of ordinary skill in the art will appreciate, commonly used examples of dihydric phenols include but are not limited to resorcinol, catechol, hydroquinone, or 2-methyl hydroquioninone and the like. Examples of bisphenols include but are not limited to, Bisphenol A (BPA), 4,4'dihydroxybiphenyl, 1,1-bis(4-dihydroxy-3-methylphenyl)cyclohexane, 4,4'-(1-phenylethylidene)bisphenol, 4,4'dihydroxydiphenylsulfone, 4,4'-cyclohexylidenebisphenol and the like. Similarly, commonly used carbon acid diester reactants include diaryl carbonates, such as diphenyl carbonate (DPC) or activated diaryl carbonates, such as bismethylsalicylcarbonate (BMSC). In the following discussions of specific embodiments of the invention, DPC and BPA will be used as exemplary reactants for the formation of a polycarbonate. However, this usage is for convenience only and reflects the fact that DPC and BPA are among the most common reactants used in production of polycarbonates. It is not intended to limit the invention to these starting materials.

As used herein, the term "transparent" includes embodiments where the level of transmittance for a disclosed polymer is greater than 50%, including exemplary transmittance values of at least 60%, 70%, 80%, 85%, 90%, and 95%, or any range of transmittance values derived from the above exemplified values. Transmittance can be measured for a disclosed polymer according to ASTM method D1003.

As used herein, the term "haze" includes embodiments where the level of haze for a disclosed polymer is less than 80%, including haze values of less than 70%, 60%, 50%, 40%, 30%, 20%, 10%, 5%, and 1%, or any range derived from these values. Haze can be measured for a disclosed polymer according to ASTM method D1003.

As summarized above, in a first aspect the present invention provides a transparent tetrapolymer composition that is capable of use in forming polymer blends with any one or more conventional polycarbonate polymers. As the name tetrapolymer implies, the tetrapolymer comprises four co-monomer components: a styrene component, and acrylonitrile, a methylmethacrylate component, and an α-methylstyrene component. Further, the tetrapolymer exhibits a refractive index value "n" that is at least substantially similar to a refractive index value "n" of a conventional polycarbonate such that any resulting blend of the disclosed tetrapolymer with a conventional polycarbonate exhibits a refractive index value "n" that itself is at least substantially similar to a refractive index value "n" of a conventional polycarbonate. Optionally, the disclosed tetrapolymer compositions may also comprise minor amounts of one or more refractive index modifier additives to ensure that the refractive index of the composition is substantially similar to the refractive index value "n" of a conventional polycarbonate of Bisphenol-A. To the extent that one or more optional refractive index modifier additives are to be used, one or ordinary skill in the art could readily determine the desired additive and the desired amount to be used through no more than routine experimentation.

As one of ordinary skill in the art will appreciate, a refractive index or index of refraction of a substance or medium is a measure of the speed of light in that substance or medium. It is typically expressed as a ratio of the speed of light in vacuum relative to that in the considered substance or medium. This can be written mathematically as:

$$n = \text{speed of light in a vacuum/speed of light in medium}$$

For example, the refractive index of water is 1.33, meaning that light travels 1.33 times faster in vacuum than it does in water. Conventional polycarbonate has a refractive index "n" within the range of about 1.584 to 1.588, with a targeted value of about 1.586. As such, according to embodiments of the invention, the tetrapolymer exhibits a refractive index value "n" that is similarly in the range of from 1.584 to 1.588. In a further embodiment, the tetrapolymer exhibits a refractive index value "n" of about 1.586.

Each of the four co-monomers present in the tetrapolymer also exhibit their own specific refractive indices "n." Specifically, styrene monomer exhibits a refractive index of about 1.5894, acrylonitrile monomer exhibits a refractive index of about 1.5187; methylmethacrylate monomer exhibits a refractive index of about 1.4893; and α-methylstyrene monomer exhibits a refractive index of about 1.6100. Thus, when utilized to prepare the tetrapolymer of the invention, each co-monomer should be present in a relative weight percent or part by weight amount such that the refractive index of the resulting tetrapolymer exhibits the desired refractive index.

For example, according to embodiments of the invention the tetrapolymer comprises "w" parts by weight styrene; "x" parts by weight acrylonitrile; "y" parts by weight methylmethacrylate; and "z" parts by α-methylstyrene, wherein the values of w, x, y, and z satisfy the following relationship:

$$\frac{(w \times 1.5894) + (x \times 1.5187) + (y \times 1.4893) + (z \times 1.6100)}{100} = 1.5869.$$

Exemplary tetrapolymer compositions can therefore comprise: a) about 1 to 68 parts by weight styrene; b) about 1 to 17 parts by weight acrylonitrile; c) about 0.5 to 13 parts by weight methylmethacrylate; and d) about 22 to 78 parts by α-methylstyrene, wherein the total parts by weight of components a), b), c), and d) is about 100 parts by weight. To that end, it will be appreciated in view of the foregoing description that specific tetrapolymer formulations as disclosed herein exhibiting the desired refractive index can be identified by one of ordinary skill in the art through routine experimentation. Further, specific non-limiting examples of tetrapolymer formulations of the invention having the desired refractive index are set forth in the Examples which follow.

According to aspects of the invention, the disclosed cotetrapolymers are preferably transparent. To that end, the disclosed tetrapolymers can exhibit a level of transmittance that is greater than 50%, including exemplary transmittance values of at least 60%, 70%, 80%, 85%, 90%, and 95%, or any range of transmittance values derived from the above exemplified values. In still further aspects, the disclosed cotetrapolymers exhibit relatively high levels of transparency characterized by exhibiting a transmittance of at least 80%. Transparency can be measured for a disclosed polymer according to ASTM method D1003.

According to aspects of the invention, the disclosed cotetrapolymers preferably exhibit a level of "haze" that is less than 80%, including haze values of less than 70%, 60%, 50%, 40%, 30%, 20%, 10%, 5%, and 1%, or any range derived from these values. In still further aspects, the disclosed cotetrapolymers exhibit relatively low levels of haze characterized by exhibiting a "haze" value that is less than 20%. Haze can be measured for a disclosed polymer according to ASTM method D1003.

The tetrapolymers of the present invention can be prepared by any conventionally known copolymerization techniques whereby an appropriate amount of a styrene component, an acrylonitrile component, a methylmethacrylate component, and an α-methylstyrene component are copolymerized. In further aspects of the invention, the disclosed tetrapolymers can be blended with a conventional polycarbonate component to provide a resulting polymer blend exhibiting a refractive index "n" substantially similar or even the same as the refractive index of the conventional polycarbonate present in the polymer blend. As such, according to embodiments of the invention, polymer blends comprising the disclosed tetrapolymer exhibit a refractive index value "n" that is similarly in the range of from 1.584 to 1.588. In a further embodiment, the disclosed polymer blends can exhibit a refractive index value "n" of about 1.586.

Disclosed polymer blends can comprise any desired amount of the conventional polycarbonate component relative to the this disclosed tetrapolymer component. For example, disclosed polymer blends can comprise from 1 to 99 weight % of a conventional polycarbonate, including exemplary amounts of 5, 10, 15, 20, 25, 30, 35, 40, 45, 50, 55, 60, 65, 70, 75, 80, 85, 90, and even 95 weight %. Likewise, the disclosed polymer blends can also comprise any desired amount of the tetrapolymer component. For example, disclosed polymer blends can comprise from 1 to 99 weight % of the disclosed tetrapolymer, including exemplary amounts of 5, 10, 15, 20, 25, 30, 35, 40, 45, 50, 55, 60, 65, 70, 75, 80, 85, 90, and even 95 weight %.

The disclosed polymer blends according to the invention may further comprise conventionally used additives for polymers or for polymer mixtures, for example, fillers, reinforcing fibres, stabilisers, flame-retardants, dyes and pigments. Still further, the polymer blends according to the invention may be prepared according to the conventionally used methods of preparing polymer mixtures.

In still further aspects of the invention, it should be understood and appreciated that the disclosed polymer blends can further exhibit levels of haze and transparency that are at least substantially similar to the levels of haze and transparency that can be exhibited by the disclosed tetrapolymers. For example, and without limitation, a disclosed polymer blend can exhibit a level of transmittance that is greater than 50%, including exemplary transmittance values of at least 60%, 70%, 80%, 85%, 90%, and 95%, or any range of transmittance values derived from the above exemplified values. In still further aspects, the disclosed polymer blends can exhibit relatively high levels of transparency characterized by exhibiting a transmittance of at least 80%. The disclosed polymer blends can also exhibit a level of "haze" that is less than 80%, including haze values of less than 70%, 60%, 50%, 40%, 30%, 20%, 10%, 5%, and 1%, or any range derived from these values. In still further aspects, the disclosed polymer blends exhibit relatively low levels of haze characterized by exhibiting a "haze" value that is less than 20%.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

In this example, a design of experiment analysis was performed to evaluate possible combinations of the four disclosed co-monomer components: styrene, acrylonitrile, methylmethacrylate, and α-methylstyrene component. The target of the study was to synthesize copolymers having a refractive index of a conventional polycarbonate of bisphenol A (1.5869), by copolymerizing the appropriate amounts of each of the four comonomers without affecting its blend compatibility and other performance and processing properties when blended with polycarbonate. The respective refractive index values for the four co-monomers used in synthesizing the disclosed tetrapolymers are set forth in Table 1 below:

TABLE 1

| | Co-monomer | Refractive Index |
|---|---|---|
| A | Styrene | 1.5894 |
| B | Acrylonitrile | 1.5187 |
| C | Methylmethacrylate | 1.4893 |
| D | α-methylstyrene | 1.6100 |

The overall refractive index for the co-polymers generated in the design of experiment study was calculated on the basis of weight percent of respective monomer in total 100 parts by weight of a respective polymer formulation. The design of experiment results for various combinations of the four respective monomers are set forth in Table 2 below, where column A represents the parts by weight amount of styrene comonomer, column B represents the parts by weight amount of acrylonitrile monomer, column C represents the parts by weight amount of methylmethacrylate monomer, and column D represents the parts by weight amount of α-methylstyrene monomer. Column RI reports the calculated refractive index for the respective copolymers.

TABLE 2

| | A | B | C | D | RI |
|---|---|---|---|---|---|
| 1 | 80 | 0 | 20 | 0 | 1.5694 |
| 2 | 55 | 15 | 10 | 20 | 1.5729 |
| 3 | 60 | 20 | 20 | 0 | 1.5552 |
| 4 | 0 | 20 | 0 | 80 | 1.5917 |
| 5 | 80 | 20 | 0 | 0 | 1.5753 |
| 6 | 0 | 20 | 20 | 60 | 1.5676 |
| 7 | 0 | 0 | 20 | 80 | 1.5859 |
| 8 | 30 | 20 | 20 | 30 | 1.5614 |
| 9 | 45 | 10 | 0 | 45 | 1.5916 |
| 10 | 80 | 20 | 0 | 0 | 1.5753 |
| 11 | 80 | 6.7 | 6.7 | 6.7 | 1.5794 |
| 12 | 20 | 0 | 0 | 80 | 1.6059 |
| 13 | 45 | 0 | 10 | 45 | 1.5887 |
| 14 | 0 | 0 | 20 | 80 | 1.5859 |
| 15 | 80 | 0 | 0 | 20 | 1.5935 |
| 16 | 20 | 15 | 10 | 55 | 1.5801 |
| 17 | 0 | 20 | 0 | 80 | 1.5917 |
| 18 | 80 | 0 | 20 | 0 | 1.5694 |
| 19 | 45 | 10 | 0 | 45 | 1.5916 |
| 20 | 0 | 10 | 10 | 80 | 1.5888 |

Further review and analysis of the design of experiment results set forth in Table 2 provided 9 specific exemplary formulations that can be prepared from the four co-monomers described above and which results in a refractive index value "n" of 1.5869. These 9 additional formulations are set forth in Table 3 below:

TABLE 3

|   | Styrene | Acrylonitrile | Methyl-methacrylate | α-methylstyrene | RI |
|---|---------|---------------|---------------------|-----------------|--------|
| 1 | 35.85   | 12.92         | 3.24                | 47.88           | 1.5869 |
| 2 | 8.12    | 8.59          | 11.25               | 72.03           | 1.5869 |
| 3 | 28.83   | 14.45         | 3.29                | 53.43           | 1.5869 |
| 4 | 38.87   | 4.16          | 9.36                | 47.61           | 1.5869 |
| 5 | 68.46   | 9.16          | 0.52                | 21.85           | 1.5869 |
| 6 | 1.10    | 8.23          | 12.72               | 77.95           | 1.5869 |
| 7 | 18.27   | 17.05         | 3.13                | 61.56           | 1.5869 |
| 8 | 54.07   | 0.96          | 9.18                | 35.79           | 1.5869 |
| 9 | 66.77   | 7.16          | 2.33                | 23.74           | 1.5869 |

A second design of experiment analysis was performed to further evaluate possible combinations of the four disclosed co-monomer components that are capable of providing a refractive index at least substantially similar to a conventional polycarbonate of bisphenol A and which similarly exhibit a relatively high level of transparency (at least 80%) and a relatively low level of haze (less than 20%). In this study, various combinations and amounts of the co-monomers were copolymerized. The respective refractive index values for the four co-monomers used in synthesizing the disclosed tetrapolymers are again those as set forth in Table 1 above. The overall refractive index for the co-polymers generated in the design of experiment study was calculated on the basis of weight percent of respective monomer in total 100 parts by weight of a respective polymer formulation.

The results of this second design of experiment analysis are set forth in Table 4 where the calculated refractive index, measured percent transparency, and measured percent haze are shown. As before, column A represents the parts by weight amount of styrene comonomer, column B represents the parts by weight amount of acrylonitrile monomer, column C represents the parts by weight amount of methylmethacrylate monomer, and column D represents the parts by weight amount of α-methylstyrene monomer. Column RI reports the calculated refractive index for the respective copolymers. The percent transmission and percent haze were measured for a blend of 95% Lexan 101-111N and 5% of the indicated copolymer. Sample C0 represents a Lexan 101-111N polycarbonate resin control available from SABIC Innovative Plastics.

Comparative samples C1 through C21 depict the results of several samples where a combination of relatively high transparency and relatively low haze was not achieved. Though many of the reported comparative samples C1 through C21 are themselves inventive cotetrapolymers of the invention, samples C2-C4, C6-C7, C11-C12, C14-C16, and C19-C20 represent comparative samples of copolymers where all four co-monomers were not present. Further, samples Ex. 1, Ex. 2, and Ex. 3 represent three specific and exemplary inventive samples that were identified as exhibiting a calculated refractive index identical to that of the control polycarbonate resin and which exhibited a relatively high transparency (greater than 80%) and a relatively low level of haze (less than 20%).

TABLE 4

|      | A     | B     | C     | D     | RI     | % Trans | % Haze |
|------|-------|-------|-------|-------|--------|---------|--------|
| C0   | 0     | 0     | 0     | 0     | 1.5860 | 90.1    | 1.1    |
| C1   | 53.0  | 11.0  | 11.0  | 25.0  | 1.5758 | 70.1    | 55.0   |
| C2   | 70.0  | 0.0   | 2.5   | 27.5  | 1.5926 | 77.8    | 11.5   |
| C3   | 37.5  | 25.0  | 0.0   | 37.5  | 1.5795 | 75.5    | 16.8   |
| C4   | 25.0  | 0.0   | 25.0  | 50.0  | 1.5747 | 75.1    | 20.4   |
| C5   | 25.0  | 25.0  | 25.0  | 25.0  | 1.5519 | 64.2    | 84.3   |
| C6   | 25.0  | 15.0  | 0.0   | 60.0  | 1.5912 | 78.6    | 18.0   |
| C7   | 50.0  | 0.0   | 0.0   | 50.0  | 1.5997 | 78.4    | 31.4   |
| C8   | 25.0  | 25.0  | 12.5  | 37.5  | 1.5669 | 67.2    | 34.9   |
| C9   | 37.5  | 12.5  | 25.0  | 25.0  | 1.5607 | 66.6    | 35.3   |
| C10  | 37.5  | 25.0  | 12.5  | 25.0  | 1.5644 | 63.6    | 47.6   |
| C11  | 50.0  | 25.0  | 0.0   | 25.0  | 1.5769 | 72.5    | 30.5   |
| C12  | 70.0  | 0.0   | 2.5   | 27.5  | 1.5926 | 79.2    | 32.9   |
| C13  | 37.8  | 8.0   | 16.4  | 37.8  | 1.5750 | 78.0    | 23.3   |
| C14  | 50.0  | 0.0   | 25.0  | 25.0  | 1.5695 | 65.6    | 37.0   |
| C15  | 25.0  | 0.0   | 25.0  | 50.0  | 1.5747 | 75.4    | 21.2   |
| C16  | 25.0  | 15.0  | 0.0   | 60.0  | 1.5912 | 77.7    | 18.1   |
| C17  | 34.9  | 3.9   | 5.1   | 56.1  | 1.5931 | 79.0    | 25.4   |
| C18  | 50.0  | 0.0   | 25.0  | 25.0  | 1.5695 | 69.0    | 28.4   |
| C19  | 75.0  | 25.0  | 0.0   | 0.0   | 1.5717 | 71.9    | 22.9   |
| C20  | 40.0  | 25.0  | 35.0  | 0.0   | 1.5367 | 47.7    | 98.7   |
| C21  | 0.0   | 25.0  | 35.0  | 40.0  | 1.5449 | 53.6    | 94.4   |
| Ex 1 | 38.32 | 16.32 | 1.00  | 44.36 | 1.586  | 83.8    | 10.1   |
| Ex 2 | 27.33 | 11.56 | 6.48  | 54.64 | 1.586  | 83.6    | 17.2   |
| Ex 3 | 32.26 | 4.13  | 10.74 | 49.87 | 1.586  | 83.8    | 12.5   |

Review of the data in Table 4 shows that for the exemplified samples tetrapolymer polymer formulations comprising all four of the comonomers in Table 1 were necessary in order to obtain both high transparency (>80%) and low haze (<20%). In contrast, comparative examples C2, C3, C6 and C16 are tripolymers that show haze values less than 20%, but did not achieve percent transmission values of over 80%.

What is claimed is:

1. A tetrapolymer composition, comprising:
   a) styrene;
   b) acrylonitrile;
   c) methylmethacrylate; and
   d) α-methylstyrene,
wherein the tetrapolymer exhibits a refractive index value "n" at least similar to a refractive index value "n" of a conventional polycarbonate, and wherein the tetrapolymer exhibits a refractive index value "n" that is in the range of from 1.584 to 1.588.

2. The tetrapolymer composition of claim 1, wherein the tetrapolymer exhibits a refractive index value "n" of about 1.586.

3. The tetrapolymer composition of claim 1, comprising:
   a) 1 to 68 parts by weight styrene;
   b) 1 to 17 parts by weight acrylonitrile;
   c) 0.5 to 13 parts by weight methylmethacrylate; and
   d) 22 to 78 parts by α-methylstyrene,
wherein the total parts by weight of components a), b), c), and d) is about 100 parts by weight.

4. The tetrapolymer composition of claim 1, comprising:
   a) about 35.85 parts by weight styrene;
   b) about 12.92 parts by weight acrylonitrile;
   c) about 3.24 parts by weight methylmethacrylate; and
   d) about 47.98 parts by α-methylstyrene.

5. The tetrapolymer composition of claim 1, comprising:
   a) about 8.12 parts by weight styrene;
   b) about 8.59 parts by weight acrylonitrile;
   c) about 11.26 parts by weight methylmethacrylate; and
   d) about 72.03 parts by α-methylstyrene.

6. The tetrapolymer composition of claim 1, comprising:
a) about 28.83 parts by weight styrene;
b) about 14.45 parts by weight acrylonitrile;
c) about 3.29 parts by weight methylmethacrylate; and
d) about 53.43 parts by α-methylstyrene.

7. The tetrapolymer composition of claim 1, comprising:
a) about 38.87 parts by weight styrene;
b) about 4.16 parts by weight acrylonitrile;
c) about 9.36 parts by weight methylmethacrylate; and
d) about 47.61 parts by α-methylstyrene.

8. The tetrapolymer composition of claim 1, comprising:
a) about 68.46 parts by weight styrene;
b) about 9.16 parts by weight acrylonitrile;
c) about 0.52 parts by weight methylmethacrylate; and
d) about 21.85 parts by α-methylstyrene.

9. The tetrapolymer composition of claim 1, comprising:
a) about 1.10 parts by weight styrene;
b) about 8.23 parts by weight acrylonitrile;
c) about 12.72 parts by weight methylmethacrylate; and
d) about 77.95 parts by α-methylstyrene.

10. The tetrapolymer composition of claim 1, comprising:
a) about 18.27 parts by weight styrene;
b) about 17.05 parts by weight acrylonitrile;
c) about 3.13 parts by weight methylmethacrylate; and
d) about 61.56 parts by α-methylstyrene.

11. The tetrapolymer composition of claim 1, comprising:
a) about 54.07 parts by weight styrene;
b) about 0.96 parts by weight acrylonitrile;
c) about 9.18 parts by weight methylmethacrylate; and
d) about 35.79 parts by α-methylstyrene.

12. The tetrapolymer composition of claim 1, comprising:
a) about 66.77 parts by weight styrene;
b) about 7.16 parts by weight acrylonitrile;
c) about 2.33 parts by weight methylmethacrylate; and
d) about 23.74 parts by α-methylstyrene.

13. The tetrapolymer composition of claim 1, comprising:
a) about 23.4 parts by weight styrene;
b) about 12.0 parts by weight acrylonitrile;
c) about 6.0 parts by weight methylmethacrylate; and
d) about 58.6 parts by α-methylstyrene.

14. The tetrapolymer composition of claim 1, comprising:
a) about 38.32 parts by weight styrene;
b) about 16.32 parts by weight acrylonitrile;
c) about 1.0 parts by weight methylmethacrylate; and
d) about 44.36 parts by α-methylstyrene.

15. The tetrapolymer composition of claim 1, comprising:
a) about 27.33 parts by weight styrene;
b) about 11.56 parts by weight acrylonitrile;
c) about 6.48 parts by weight methylmethacrylate; and
d) about 54.63 parts by α-methylstyrene.

16. The tetrapolymer composition of claim 1, comprising:
a) about 32.26 parts by weight styrene;
b) about 4.13 parts by weight acrylonitrile;
c) about 10.74 parts by weight methylmethacrylate; and
d) about 49.87 parts by α-methylstyrene.

17. The tetrapolymer composition of claim 1, wherein the composition exhibits a level of transparency greater than 80% and a level of haze less than 20%.

18. The tetrapolymer composition of claim 1, comprising:
a) "w" parts by weight styrene;
b) "x" parts by weight acrylonitrile;
c) "y" parts by weight methylmethacrylate; and
d) "z" parts by α-methylstyrene,
wherein the values of w, x, y, and z satisfy the following relationship:

$$\frac{(w \times 1.5894) + (x \times 1.5187) + (y \times 1.4893) + (z \times 1.6100)}{100} = 1.5869.$$

19. A polymer blend composition, comprising:
a) 1 to 99 parts by weight polycarbonate; and
b) 1 to 99 parts by weight of the tetrapolymer of claim 1,
and wherein the tetrapolymer exhibits a refractive index value "n" that is in the range of from 1.584 to 1.588.

20. The polymer blend composition of claim 19, wherein the tetrapolymer of b) exhibits a refractive index value "n" of about 1.586.

21. The polymer blend composition claim 19, wherein the tetrapolymer of b) comprises:
a) 1 to 68 parts by weight styrene;
b) 1 to 17 parts by weight acrylonitrile;
c) 0.5 to 13 parts by weight methylmethacrylate; and
d) 22 to 78 parts by α-methylstyrene,
wherein the total parts by weight of components a), b), c), and d) is about 100 parts by weight.

22. The polymer blend composition of claim 19, wherein the tetrapolymer of b) comprises:
a) "w" parts by weight styrene;
b) "x" parts by weight acrylonitrile;
c) "y" parts by weight methylmethacrylate; and
d) "z" parts by α-methylstyrene,
wherein the values of w, x, y, and z satisfy the following relationship:

$$\frac{(w \times 1.5894) + (x \times 1.5187) + (y \times 1.4893) + (z \times 1.6100)}{100} = 1.5869.$$

23. The polymer blend composition of claim 19, wherein the composition exhibits a level of transparency greater than 80% and a level of haze less than 20%.

24. The polymer blend composition of claim 23, comprising:
a) about 95 parts by weight polycarbonate; and
b) about 5 parts by weight of the tetrapolymer of claim 1.

25. The polymer blend composition of claim 23, comprising:
a) about 90 parts by weight polycarbonate; and
b) about 10 parts by weight of the tetrapolymer of claim 1.

* * * * *